United States Patent [19]

Mercer

[11] Patent Number: 4,478,546
[45] Date of Patent: Oct. 23, 1984

[54] QUICK INSERTION AND RELEASE BOLT SYSTEM

[76] Inventor: Mark J. Mercer, 5149 S. Kilbourn, Chicago, Ill. 60632

[21] Appl. No.: 332,618

[22] Filed: Dec. 21, 1981

[51] Int. Cl.³ .............................................. F16B 35/02
[52] U.S. Cl. ...................................................... 411/385
[58] Field of Search ............... 411/383, 384, 385, 395, 411/417, 419, 321, 322, 323, 221, 432, 433, 437, 63, 64, 65

[56] References Cited

U.S. PATENT DOCUMENTS

| 1,050,279 | 1/1913 | Joseph | 411/385 |
| 1,276,785 | 8/1918 | McGinnis | 411/432 |
| 2,664,023 | 12/1953 | Mugford | 411/433 |
| 2,693,732 | 11/1954 | Durst | 411/385 |
| 2,804,796 | 9/1957 | Devine | 411/385 |
| 2,892,376 | 6/1959 | Schonfeld | 411/63 |
| 3,456,547 | 7/1969 | Strong | 411/385 X |
| 3,922,946 | 12/1975 | Grayson | 411/385 |
| 3,943,817 | 3/1976 | Mess | 411/385 |
| 3,952,626 | 4/1976 | Townsend | 411/433 |

FOREIGN PATENT DOCUMENTS

| 968198 | 5/1975 | Canada | 411/433 |
| 907211 | 6/1945 | France | 411/433 |
| 457767 | 5/1936 | United Kingdom | 411/385 |

*Primary Examiner*—Thomas J. Holko
*Assistant Examiner*—Adrian H. Whitcomb, Jr.

*Attorney, Agent, or Firm*—Hill, Van Santen, Steadman & Simpson

[57] ABSTRACT

A quick release bolt system utilizes two bolt sections. Each bolt section approximates one half of a bolt and has a half head portion and half threaded portion. Each section has an inner face which are parallel to and approach one another when the two bolt sections are assembled. A slide insert is receivable between the bolt section faces such that when the sections are assembled with the slide insert therebetween, the bolt can be threaded into a threaded receiving aperture in a block or the like with the threads of the bolt engaging the corresponding threads of the aperture. On the other hand, with the slide insert removed, the bolt sections approach each other and abut at their flat faces sufficiently close such that the two bolt sections can be slid into the threaded receiving aperture without the threads of the bolt sections engaging the threads of the threaded aperture. When the bolt is in position, the insert is slid between the bolt sections causing the sections to move away from one another and align so as to cause engagement between the threads of the aperture and the threads of the half sections. The bolt can then be tightened down. To remove the bolt, the bolt is loosened approximately one turn and the insert is pulled free such that the two bolt sections will now move towards one another and disengage from the threads of the threaded aperture and permit rapid removal of the bolt.

2 Claims, 15 Drawing Figures

QUICK INSERTION AND RELEASE BOLT SYSTEM

BACKGROUND OF THE INVENTION

To fasten a first member to a second member or for securing an element to a block, a threaded bolt having a head portion and threaded portion may be employed which cooperates either with a threaded aperture or a threaded nut. To secure the connection, it is necessary to rotate the bolt a sufficient number of revolutions such that the head of the bolt abuts against either the block facing surface or the nut. The number of revolutions depends upon the thread pitch and the length of the bolt.

Substantial time is frequently involved to effect the sufficient number of rotations required prior to securement. In many applications, this lost time can be a severe disadvantage. For example, if bolts are employed on racing vehicles, during pit stops or the like when rapid replacement of parts is necessary, an unavoidable delay arises due to the large number of revolutions frequently required to replace a part or parts retained by the bolt.

SUMMARY OF THE INVENTION

It is an object of this invention to provide a quick release bolt system which will permit rapid securement of a bolt in its threaded receiving aperture and while also permitting rapid release of the bolt from the receiving aperture.

It is another object of this invention to provide a quick insertion and release bolt system wherein the mechanical integrity and strength of the bolt is retained together with the strength and integrity of the connection effected by the bolt.

It is another object of this invention to provide an inexpensive quick insertion and release bolt system which will have a high degree of safety.

According to the quick insertion and release bolt system of the invention, first and second bolt sections are provided, each having a head portion and a threaded portion, the latter being formed of a substantially half round section which is threaded and a substantially flat face. A slide insert is provided which is receivable between the flat faces of the two bolt sections when they are assembled. In such assembled condition, the threads of the bolt sections engage in threads of a corresponding aperture. On the other hand, with the slide insert removed, the two bolt sections approach each other such that the flat faces are in contact with one another and the first and second bolt sections have approached each other sufficiently close such that threads of the bolt sections do not engage with threads of the threaded receiving aperture, thus allowing the bolt to be rapidly inserted or removed from the threaded aperture.

In a preferred embodiment of the invention, each threaded bolt section at its flat face has a rectangular channel. The slide insert is designed with flanges or fins which are receivable in the channels. Preferably two long flanges and two short flanges are provided, the two short flanges being received in the respective channels of the bolt sections and the two longer flanges being in flat surface engagement with remaining portions of the bolt section flat surfaces when the bolt sections are assembled.

With the invention, when the bolt is tightened down, the insert is securely retained between the bolt sections by friction. To further assist in mechanical stability, a T-shaped portion is provided at one end of the insert receivable between the head portions on each bolt section.

DESCRIPTION OF THE PREFERRED EMBODIMENTS

Figure 1:
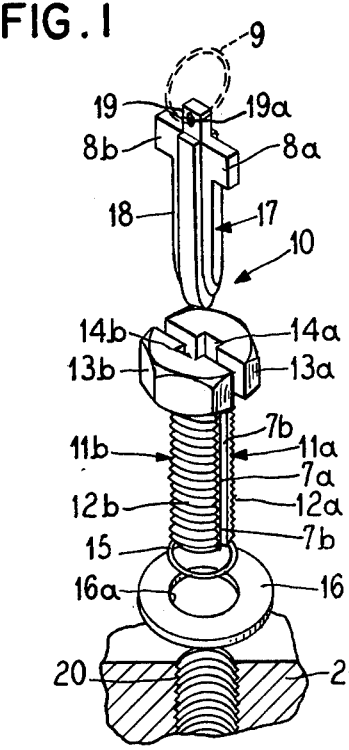
FIG. 1 is an exploded perspective view of the quick insertion and release bolt system of the invention.

An exploded view of the quick insertion and release bolt system of the invention is generally illustrated at 10 in FIG. 1. First and second bolt half sections 11a and 11b are provided. Although the term "half section" is used throughout the specification, it is to be understood that with the invention, with respect to a standard bolt, each bolt section is somewhat less than a complete half section as explained hereafter.

Each section 11a, b has a half round threaded portion 12a, b and a half head portion 13a, b.

Each threaded portion 12a, b also has a flat surface or end face 7a, b which face each other when the two bolt sections are assembled. Within each flat face, a cut out channel 14a, b is provided having a substantially rectangular cross-section.

Figure 2:
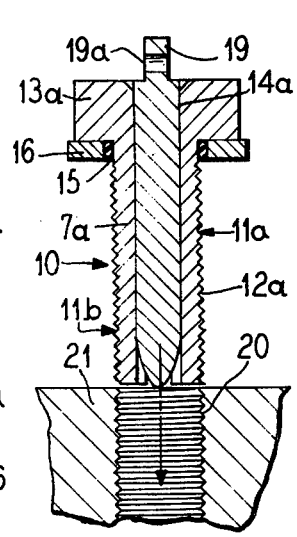
FIG. 2 is a side cross-sectional view of the assembled insertion and release bolt system of the invention.

A rubber flexible retainer ring 15 is slidably received over the two bolt sections and placed near the head portions 13a, b so as to retain the two sections in substantial coincidence with one another as shown in FIG. 2. Over the retainer ring 15 a washer 16 is placed whose inner aperture 16a has a dimension corresponding to an outer dimension of the retainer ring 15.

A slide insert for quick insertion and release of the bolt system is generally illustrated at 17. The slide insert 17 comprises a shaft 18 having a cross section as shown in FIG. 4C defining short flanges or ribs 25a, b and long flanges or ribs 26a, b. A pull tab 19 is provided at the top of the insert 17 and it preferably has an aperture 19a therein for engagement by a tool or a pull ring such as shown in dotted lines at 9. Adjacent the pull tab 19, extension portions 8a, b are provided so as to form a "T" shape which is receivable between the bolt section head halves 13a and b.

The bolt sections 11a, b are received in a threaded aperture 20 of a mounting block 21.

Figure 3:
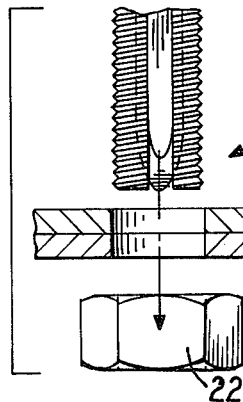
FIG. 3 is a partial view of an alternate embodiment of the system of FIG. 2 wherein a threaded nut replaces a threaded aperture for receiving the bolt.

FIG. 2 illustrates the assembled condition of the quick insertion and release bolt system of the invention with the insert in place such that the bolt sections will thread into the aperture 20 of the block 21. Alternatively, as shown in FIG. 3, rather than a block 21 with a threaded aperture 20, a nut 22 may be provided.

Figure 4A:
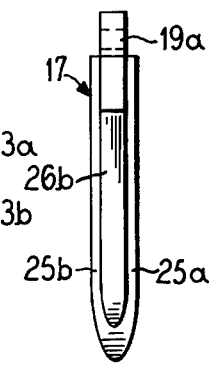
FIG. 4a is a side view of a slide insert utilized in the invention.
Figure 4B:
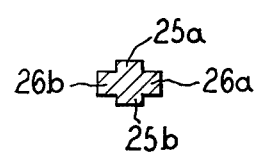
FIG. 4B is a front view of the slide insert of FIG. 4A.
Figure 4C:
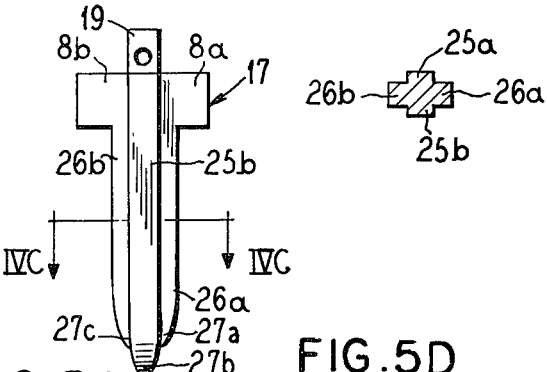
FIG. 4C is a cross-sectional view taken along line IVC—IVC of FIG. 4B.

The construction of the slidable insert 17 is shown in somewhat greater detail in FIGS. 4A, 4B, and 4C. There, the short flanges or fins 25a, b and the long flanges or fins 26a, b are visible. The flanges determine at one end a tri-point arrangement comprised of a center point 27b and two side points 27a, c.

Figure 5A:
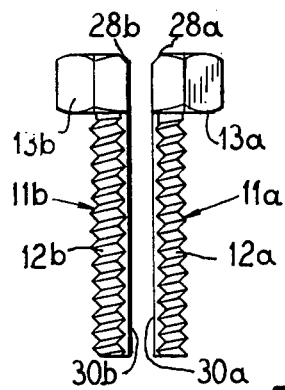
FIG. 5A is a side view of two bolt sections utilized in the invention.
Figure 5B:
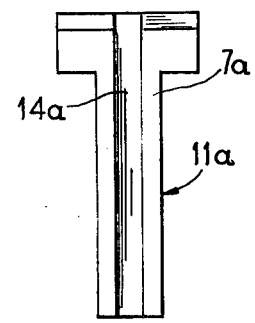
FIG. 5B is an inside view of one of the bolt sections of FIG. 5A.
Figure 5C:
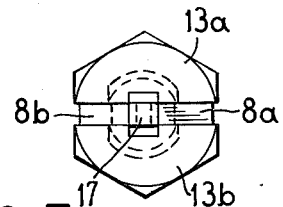
FIG. 5C is a top view of the assembled insertion and release bolt system of the invention shown in FIG. 2.

In FIGS. 5A, B, C and D further construction details of the bolt sections 11a, b are illustrated. In FIG. 5A the employment of a bevelled region 28a, b on each bolt section at the head portion 13a, b is illustrated; the bevels assist in the insertion of the slidable insert 17 point first between the bolt sections. Also of interest is the employment of the extensions 8a, b in the form of a "T" which is retained between the bolt head sections 13a, b for enhanced frictional engagement and stability of the insert 17. Also in FIG. 5D the cross-sectional shape of the channels 14a, b is illustrated.

Figure 6A:
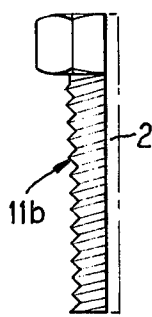
FIG. 6A is a side view of one of the bolt sections of FIG. 5A illustrating material which is removed from a half bolt section during manufacture of the bolt sections for the invention.

FIGS. 6A, B, C illustrate how the individual bolt section halves are trimmed such that when the flat surfaces 7a, b abut one another when the insert 17 is removed, the two bolt sections may freely slide into and out of the aperture 20 by virtue of a spacing which exists under such conditions.

Figure 5D:
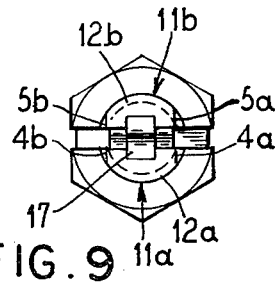
FIG. 5D is a bottom view of the assembled insertion and release bolt system of FIG. 2.
Figures 6B, 7:
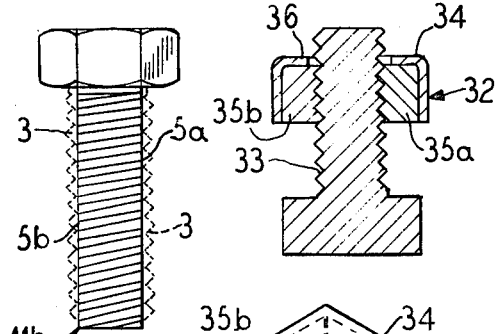
FIG. 6B is a front view of one of the bolt sections illustrating material removed during manufacture of the bolt section shown in FIG. 6A.
FIG. 7 is a side cross-sectional view of an alternate embodiment of the quick insertion and release bolt system of the invention wherein a standard bolt is employed in combination with a quick release nut.

As shown in FIGS. 6A and 6B, to manufacture bolt sections for use in the invention, a standard bolt may be cut in half longitudinally and then trimmed to create flat bevel surfaces shown in FIG. 5D at 5a, b and 4a, b. In FIGS. 6A and 6B, the dotted lines illustrate removed portions 2 and 3 which are cut away from the bolt half sections. In this fashion, with the insert removed and the bolt sections lined up against one another in abutting fashion, sufficient clearance is provided at all points of the outer rounded threaded portions of each bolt section so as to permit the bolt to cleanly pass into the threaded aperture 20 shown in FIG. 2.

In one broad form of the invention, the insert may have a rectangular cross-section and no cut out channels are provided on the flat faces 7a, b. However, it is preferred with the invention that the insert have the long and short flanged construction previously described since the flanges cooperate with the channels in each bolt section flat face 7a, b. This adds stability to the unit, particularly when it is tightened down at high torques. Furthermore, frictional engagement is increased between the insert and the bolt sections.

To utilize the invention, initially the insert 17 is removed and the two bolt sections lie flush against one another and are held in position relative to one another by the retainer ring 15. The washer 16 is slipped over the bolt sections and then the bolt is thrust into the threaded aperture 20 until the head portions 13a, b strike the securing surface against which they abut. The insert 17 is then thrust between the bolt sections. Finally, the bolt is tightened down with a wrench or the like. Depending upon the thread pitch, one or more turns may be required to obtain the desired torque. The insert is securely retained by frictional engagement between the bolt sections when the bolt has been tightened down as described above. The T-section provided by the extensions 8a, b provide additional stability and frictional engagement of the insert after tightening. With the design of the insert shown in this invention, the bolt sections are held in fixed relationship to one another so that they do not wander when the bolt system is being tightened down.

To remove the bolt, a tool or a pull ring is utilized through attachment with the pull tab 19 to remove the insert by pulling after the bolt has been released one or two turns to ease the frictional engagement to the insert. After the insert has been pulled free, the two bolt sections are free to move into close abutment at their inner flat faces 7a, b to permit rapid removal of the bolt.

Figure 8:
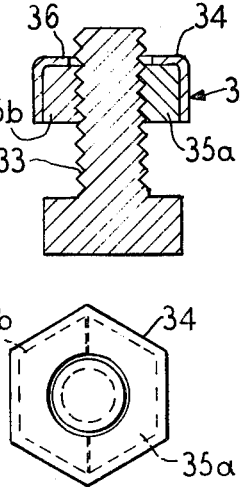
FIG. 8 is a top view of the quick release and assembly nut shown in FIG. 7.
Figure 9:
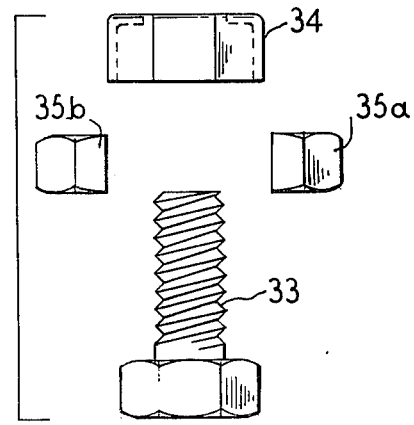
FIG. 9 is an exploded view of the standard bolt quick release and assembly nut system of the invention illustrated in FIG. 7.

In an alternate embodiment of the quick insertion and release bolt system of the invention, as shown in FIGS. 7, 8, and 9, a standard bolt 33 is received in a quick attachment and release nut assembly generally shown at 32. To construct the quick release and assembly nut system of the invention, a standard nut is cut in half. Each half section is then reduced in size so as to fit within an open-face container or pocket 34 having side walls shaped according to a peripheral surface shape of the nut and an aperture 36 in a base thereof. To remove the nut assembly, the assembly is loosened by one or two turns and then the cover 34 is removed such that the two half sections 35a, b are released from engagement with the bolt.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A quick insertion and release bolt system, comprising: first and second threaded bolt sections each comprising approximately half of a bolt and each having a head portion and threaded portion; each section having a flat face and a rounded threaded peripheral surface; a rectangular channel in each flat face running an entire length of each bolt section; a slide insert tapering to a leading point receivable between the flat faces when the bolt sections are assembled with the flat faces facing each other, said slide insert having a first pair of ribs and a second pair of ribs; the first pair of ribs being rectangular and laterally extending on opposite sides of the insert between the two flat faces and frictionally engaging substantially all portions of the faces of the threaded portions laterally of the rectangular channels when the bolt sections are held together; the slide insert having lateral extensions adjoining a termination of the first pair of ribs, said lateral extensions substantially completely filling an entire space between the head portions when the insert is fully inserted; the second pair of ribs being tapered at and extending from the leading point to a top of said lateral extensions and being rectangular and receivable in the rectangular channels; the first pair of ribs beginning and being tapered at a point rearwardly of the leading point to form a tri-point arrangement; flexible ring means for holding the two bolt sections in substantial alignment with one another with their flat faces abutting when the insert is not present between the faces; tab means extending at one end of the insert for pulling the insert away from between the two bolt sections when desired; the slide insert and each bolt section being shaped and dimensioned such that with the insert in place the peripheral rounded surfaces of the bolt sections lie on a common circle such that they both can be treaded into a threaded receiving aperture of corresponding dimension, and when the insert if removed the bolt sections with flat faces abutting freely slide into or out of the aperture without substantial threaded engagement; the arc of each of said rounded peripheral surfaces being less than 180°; and a bevelled surface being provided between the flat surface and edges of the rounded peripheral surface on each bolts section.

2. A quick insertion and release bolt system, comprising: first and second threaded bolt sections each comprising approximately half of a bolt and each having a head portion and threaded portion; each section having a flat face and a rounded threaded peripheral surface; a rectangular channel in each flat face running an entire length of each bolt section; a slide insert tapering to a leading point receivable between the flat faces when the bolt sections are assembled with the flat faces facing each other, said slide insert having a first pair of ribs and a second pair of ribs; the first pair of ribs being rectangular and laterally extending on opposite sides of the insert between the two flat faces and frictionally engaging substantially all portions of the faces of the threaded portions laterally of the rectangular channels when the bolt sections are held together; the slide insert having lateral extensions adjoining a termination of the first pair of ribs, said lateral extensions substantially completely filling an entire space between the head portions when the insert is fully inserted; the second pair of ribs being tapered at and extending from the leading point to a top of said lateral extensions and being rectangular and receivable in the rectangular channels; the first pair of ribs tapering to a termination such that the leading point is formed by said tapering of said second pair of ribs; flexible ring means for holding the two bolt sections in alignment with one another with their flat faces abutting when the insert is not present between the faces; tab means extending at one end of the insert for pulling the insert away from between the two bolt sections when desired; the slide insert and each bolt section being shaped and dimensioned such that with the insert in place the peripheral rounded surfaces of the bolt sections lie on a common circle such that they both can be threaded into a threaded receiving aperture of corresponding dimension, and when the insert is removed the bolt sections with flat faces abutting freely slide into or out of the aperture without substantial threaded engagement; the arc of each of said rounded peripheral surfaces being less than 180°; and a bevelled surface being provided between the flat surface and edges of the rounded peripheral surface on each bolt section.

* * * * *